United States Patent [19]

Narayan et al.

[11] Patent Number: 5,338,819
[45] Date of Patent: Aug. 16, 1994

[54] SOLID ISOCYANATE DERIVATIVES USEFUL IN ONE COMPONENT POLYURETHANE ADHESIVES

[75] Inventors: Thirumurti Narayan, Grosse Ile; Anthony W. Tantillo, Troy; John R. Stoll, Woodhaven, all of Mich.

[73] Assignee: BASF Corporation, Parsippany, N.J.

[21] Appl. No.: 799,814

[22] Filed: Nov. 29, 1991

[51] Int. Cl.$^5$ .................. C08G 18/10; C08G 18/30
[52] U.S. Cl. ........................ 528/60; 528/65; 528/71; 528/76; 521/159; 521/163; 521/164; 521/170; 521/172; 521/188
[58] Field of Search ............ 528/60, 65, 71, 76; 521/159, 163, 164, 172, 188, 170

[56] References Cited

U.S. PATENT DOCUMENTS

| | | | |
|---|---|---|---|
| 3,285,951 | 11/1966 | Heiss | 528/58 |
| 3,963,680 | 6/1976 | O'Keefe et al. | 528/44 |
| 4,532,316 | 7/1985 | Henn | 528/59 |
| 5,043,472 | 8/1991 | Mafoti | 560/358 |

*Primary Examiner*—John Kight, III
*Assistant Examiner*—Duc Truong
*Attorney, Agent, or Firm*—Paul L. Marshall

[57] ABSTRACT

Solid isocyanate-terminated prepolymer powders useful in preparation of films, coatings, and one-component adhesives are prepared by reacting a low molecular weight di- or polyisocyanate with a glycol mixture in a solvent in which the isocyanate is soluble but the reaction product is not.

4 Claims, No Drawings

SOLID ISOCYANATE DERIVATIVES USEFUL IN ONE COMPONENT POLYURETHANE ADHESIVES

BACKGROUND OF THE INVENTION

1. Field of the Invention

The subject invention pertains to solid isocyanate terminated prepolymers useful in preparation of one-component non-cellular polyurethane compositions. More particularly, the solid isocyanate derivatives are isocyanate-terminated compounds capable of forming thermosetting polyurethane compositions which may readily be prepared in powdered form without the necessity of grinding.

2. Background of the Invention

One component adhesives are useful commercial compositions. Such adhesives have long pot life as compared to two component adhesives which, in addition to the necessity of thorough mixing, must be used immediately after preparation. In order to have long pot lives, U.S. Pat. Nos. 3,933,759 and 3,963,710 teach the use of blocked isocyanates in the form of fine powders. Upon heating, the blocking agent "unblocks", liberating isocyanate groups which are then free to react. Addition of blocking agent requires additional processing steps, is wasteful of the blocking agent, and moreover produces products in which the presence of the blocking agent may decrease physical properties.

U.S. Pat. Nos. 4,683,279 and 2,969,386 disclose preparation of urethane linked toluene diisocyanate dimers by reacting toluene diisocyanate with a low molecular weight diol. In U.S. Pat. No. 2,969,386, the reaction occurs neat, with an excess of isocyanate, at a temperature above the melting point of the reaction mixture but low enough to avoid side reactions, and the product is then washed repeatedly with solvent to remove unreacted isocyanate. In U.S. Pat. No. 4,683,279, the diol is an unsymmetrical glycol such that the product is either fluid at room temperature or slightly above. The use of a solvent in which both the reactants and products are soluble, such as acetone, dioxane, tetrahydrofuran, or acrylonitrile is optional. The solvent is then removed by stripping or distillation at which time excess toluene diisocyanate is also removed.

U.S. Pat. No. 3,285,951 discloses the formation of solid prepolymers by reacting toluene diisocyanate with a carefully selected mixture of 2,3-butanediol isomers having a mesoisomer content of 40 percent plus two times the difference of 100 and the weight percent of the 2,4-toluene diisocyanate isomer present in the toluene diisocyanate mixture. It is stated that unless this specific glycol composition is utilized, a doughy past is obtained rather than a solid product.

U.S. Pat. No. 5,043,472 teaches the preparation of solid isocyanate terminated prepolymers by reaction of organic isocyanates with 2-methyl-1,3-propanediol. The reaction takes place neat, and the solid reaction product must be ground into fine particles if use in particulate form is desired. The patent indicates that solids prepared from other diols such as ethylene glycol, 1,4-butanediol, and propylene glycol cannot be ground into particles and are thus unsuitable for such applications.

U.S. Pat. Nos. 3,787,525; 3,817,886; and 3,917,741 teach the preparation of thermoplastic polyurethane powders by interfacially reacting a diisocyanate and difunctional compound in an inert solvent in which the isocyanate is insoluble and present in the form of an emulsion to which the difunctional compound is added. The products are relatively high molecular weight polymers which can be melted to form hot melt adhesives. Such thermoplastics adhere by cohesive properties and gap filling properties rather than through potential reaction of isocyanate groups with the substrate. Moreover, as thermoplastics, they are subject to both loss of adhesion and creep at high temperatures. U.S. Pat. No. 4,940,750 discloses a high shear method of preparation of such thermoplastics in an inert solvent.

U.S. Pat. No. 3,475,200 discloses a solventless method of preparing pastes useful for coating textile articles, containing a polyester diol or polyether diol, a uretdione diisocyanate and at least 0.3 mole of a solid chain extender having two hydroxyl or amino groups and a particle size less than 30 $\mu$m. The compositions are said to have a shelf life of several days. U.S. Pat. No. 4,251,427 further refines such compositions by incorporation of aluminosilicate molecular sieves.

U.S. Pat. No. 4,400,497 discloses suspensions of solid isocyanates in a polyol wherein the isocyanate particles are deactivated on their surface such that from 0.5 to 20 percent of the total isocyanate groups are deactivated.

U.S. Pat. Nos. 3,488,302; 4,390,678; and 4,412,033 disclose one component urethane adhesives employing an isocyanate-terminated liquid prepolymer and an insoluble polyhydroxyl compound in solid form. The products are viscous liquids which heat cure at elevated temperatures.

U.S. Pat. No. 4,352,858 discloses compositions containing a liquid isocyanate-terminated prepolymer and molten dicarbamate esters which may be used for adhesives, optionally solvent borne.

SUMMARY OF THE INVENTION

It has now been surprisingly discovered that solid isocyanate-terminated prepolymers may be easily prepared by the reaction of modified or unmodified monomeric diisocyanates with low molecular weight diols or triols by reaction in a solvent in which the starting materials are soluble but in which the reaction product is not, wherein the hydroxyl groups of the low molecular weight diols are simple straight chain glycols with a minimum of side branching adjacent to the hydroxyl groups.

DESCRIPTION OF THE PREFERRED EMBODIMENTS

Isocyanates useful as starting materials for the solid isocyanate-terminated prepolymers of the subject invention include modified and unmodified low molecular weight polyisocyanates. Higher molecular weight prepolymers prepared using close to stoichiometric amounts of a di- or polyisocyanate and a di- or polyhydroxyl compound, for example in equivalent ratios of isocyanate to hydroxyl groups of from 1:0.8 to 1:1 are of too high a molecular weight to produce the products of the subject invention.

Diisocyanates useful include the aromatic diisocyanates such as 2,4-toluene diisocyanate, 2,6-toluene diisocyanate, and mixtures thereof; 2,2'-, 2,4'- and 4,4'-methylene bis(phenylisocyanate) and mixtures thereof; and polymethylene polyphenylene polyisocyanates. Preferable are 4,4'-methylene bis(phenylisocyanate); an 80/20 mixture of 2,4- and 2,6-toluene diisocyanates; and a 50/50 mixture of 4,4'- and 2,4'-methylene bis (phenylisocyanate)s.

Modified diisocyanates may also be utilized. These isocyanates contain two diisocyanate species such as 4,4'-methylene bis(phenylisocyanate) linked through reaction of one isocyanate group in each diisocyanate to form a urea, biuret, urethane, carbodiimide or other simple linkage between molecules. Such modified isocyanates are commercially available.

The polyol component is generally a low molecular weight polyol, preferably a simple glycol such as ethylene glycol, propylene glycol, butanediol, hexanediol, neopentyl glycol, diethylene glycol, dipropylene glycol, cyclohexanediol, or cyclohexane dimethanol; or a simple triol such as glycerine, trimethylolpropane; or mixtures thereof. The simple glycols useful are straight chain glycols having no more than one alkyl branch on a carbon atom to which a hydroxyl groups is attached when the hydroxyl groups are not separated by more than two carbon atoms. Thus propylene glycol, with one methyl branch is suitable as is dipropylene glycol where there are two methyl branches on the hydroxyl carbons but where the hydroxyl groups themselves are separated by more than two carbon atoms. Examples of glycols which are not suitable include 2-methyl-1,2-propanediol and 2,3-butanediol. In both of the latter, the hydroxyl groups are separated by only two carbon atoms and there are two alkyl branches on a carbon atom attached to a hydroxyl group. Polyethylene glycols having molecular weights below 1000, preferably about 600 may be used in minor amounts when admixed with the aforementioned simple glycols.

The isocyanate/glycol stoichiometry is such that at least 1.6 equivalents of isocyanate are present for each equivalent of glycol, preferably 2.0 equivalents per mole equivalent of glycol. The reaction takes place in a solvent for the isocyanate which is not a solvent for the product. Such a solvent is dry hexane. Other solvents that may be beneficially employed are heptane and cyclohexane. Other suitable solvents may readily be determined by those skilled in the art. The reaction generally takes place at from 50°–70° C. in an amount of solvent such that the solvent/isocyanate weight ratio is from 3:1 to 15:1. A urethane promoting catalyst such a metal catalyst is necessary. Catalysts that may be employed include dibutyltin dilaurate, stannous octoate, dibutyltin diacetate, dibutyltin di(2-ethylhexoate) and the like.

The isocyanate terminated products separate from the reaction mixture as the reaction proceeds. If desirable, a second inert solvent in which the product is even less soluble may be added to facilitate total precipitation of the product, although that has not proven necessary. The product is removed by filtration and dried under vacuum to give white to off-white powders having isocyanate group weight percents of from about 5.0% to 21%, preferably from 7 to about 14%.

The powders thus produced may be used by themselves, with inert suspending agents as a paste or caulk, or with reactive polyol compounds to form adhesives. In some cases, suspensions of the products in certain polyols allowed for the preparation of hard clear films which may have uses as adhesives or coatings.

The solid isocyanate-terminated prepolymers are useful in forming one-component adhesives, encapsulants, and polyurethane films and coatings. In such uses, the solid prepolymer powders are added to conventional polyoxyalkylene polyether polyols or polyester polyols at an isocyanate index of greater than 100, and cured at elevated temperature, generally from 75°–200° C., more preferably 100°–150° C. Suitable polyoxyalkylene polyethers for such uses are the polyoxyethylene glycols, polyoxypropylene glycols, poly THF and conventional urethane polyols prepared by oxyalkylating an initiator molecule such as ethylene glycol, diethylene glycol, propylene glycol, dipropylene glycol, glycerine, trimethylolpropane, pentaerythrytol, sorbitol, sucrose, and the like with ethylene oxide, propylene oxide, or their mixtures. Oxyalkylated aromatic amines may also be employed. A particularly useful polyol is that obtained by oxyethylating bisphenol A or mixtures of bisphenol A with a second initiator such as diethylene glycol.

Any suitable hydroxy-terminated polyester may be used, such as are obtained, for example, from the reaction of polycarboxylic acids or polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-[2,2,1]-5-heptane-2,3-dicarboxylic acid anhydride also may be used in the preparation of the hydroxyterminated polyesters. Any suitable polyhydric alcohol, including both aliphatic and aromatic, may be reacted with the polycarboxylic acid or polycarboxylic acid anhydride to prepare the hydroxyterminated polyesters. Representative examples include ethylene glycol, 1,3-propanediol, 1,2-propane glycol, 1,4-butanediol, 1,3-butanediol, 1,2-butanediol, 1,5-pentanediol, 1,4-pentanediol, 1,3-pentanediol, 1,6-hexanediol, 1,7-heptanediol, 2-butane-1,4-diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A, and hydroxyalkyl ethers of phenolic compounds such as bis[2hydroxyethyl] ether of hydroquinone, and the alkylene oxide adducts of the above named polyhydric alcohols. The hydroxy terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy terminated polyester with only a portion of the components being a diamine such as ethylenediamine. The hydroxy-terminated polycaprolactone polyol.

Preferably the polyester polyol is an ester obtained by reacting adipic acid with ethylene glycol and 1,4-butanediol or with diethylene glycol alone having a hydroxyl number of about 40 to 120. In the former polyester diol the ratio of ethylene glycol to butanediol may range from about 1:1 to about 2.5:1.

Polyoxyalkylene ether polyols may also be used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran such as polytetramethyleneether glycols and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from 2 to 6 carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1959 and in Encyclopedia of Chemical Technology, Vol. 7, pp. 257-262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polymer dispersions in polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re 28,715), 3,304,273, 3,652,639, and 3,823,201 (Re 29,104), the disclosures of which are hereby incorporated by reference.

The solid prepolymers may be dispersed into the polyol, catalyst, and other components with traditional methods. They may also be dispersed into a polyol or glycol component with the glycol or polyol in stoichiometric excess, and cured by addition of an isocyanate component as in traditional polyurethane processing. In such cases, if storage stability of the solid prepolymer/polyol mixture is desirable, it should be formulated in the absence of the urethane promoting catalyst which can be metered in at the mix head.

The invention will now be illustrated by the following examples which should not be construed as limiting the subject invention in any way. Polyisocyanate A consists of 98 weight percent of 4,4'-methylene bis(phenylisocyanate) and 2 weight percent of 2,4'-methylene bis(phenylisocyanate); polyisocyanate B consists of a 1:1 mixture of 4,4'- and 2,4'-methylene bis(phenylisocyanate)s; and polyisocyanate C consists of an 80/20 blend of 2,4- and 2,6-toluene diisocyanates.

Typical Procedure for Solid Prepolymer Synthesis

To a 4-neck 2 liter roundbottom flask equipped with addition funnel, stirrer, thermocouple well, and condenser with nitrogen inlet was added 1.6 equivalents of Polyisocyanate A, Polyisocyanate B, or Polyisocyanate C; 1200 Ml of dry hexane, and 25-50 mg of dibutyltin dilaurate catalyst. The temperature of this mixture was brought to 50° C. at which time an amount (0.8 equivalents) of the low molecular weight polyol was added dropwise to the mixture. The temperature of the reaction was kept under 60 C during the addition and then raised to 69°-70° C. (refluxing hexane) for at least 1.5 to 3 h. The reaction mixture was allowed to cool and then filtered through Whatman filter paper #542 (2.7 μm rating). The solid was then dried under vacuum to give white to off white powders (a dust mask should be worn while handling). The synthesis and characterization data are summarized in the attached table.

TABLE 1

| Example | Isocyanate | Diol Used [1] | % NCO | Melting Point |
|---|---|---|---|---|
| 1 | A | 1,4-Butanediol | 10.9 | 263-265 |
| 2 | A | EG | 11.9 | 298 |
| 3 | A | PG | 8.7 | 142 |
| 4 | A | 1,6-Hexanediol | 9.4 | 252-262 |
| 5 | A | DEG | 7.4 | 136 |
| 6 | A | DEG(92.8%)/PG (7.2%) [2] | 9.0 | 132-135 |
| 7 | A | DEG(87.2%)/EG (12.8%) | 9.8 | 115-150 |
| 8 | A | DEG(97.2%)/E600 (2.8%) | 9.1 | 117-169 |
| 9 | A | DEG(94.4%)/E600 (5.6%) | 9.2 | 128-158 |
| 10 | A | DEG(76.3%)/E600 (23.7%) | 10.4 | 136-142 |
| 11 | B | EG | 13.5 | 140-180 |
| 12 | C | EG | 11.8 | 118-155 |

[1] Polyol mixtures are expressed as weight %
[2] DEG is diethylene glycol, EG is ethylene glycol, PG is propylene glycol, E600 is a polyoxyethylene glycol having a molecular weight of 600 manufactured by BASF Corporation as Pluracol ® Polyol E-600

Preparation of Hard Polyurethanes

A variety of hard polyurethanes were prepared as described in Table 2 by dispersing the solid isocyanate of Example 12 into a variety of polyether polyols and curing the dispersions. In the case of Examples 14 and 15, a clear film was obtained. Polyol A is a bisphenol A/diethylene glycol coinitiated polyether polyol having a functionality of 2 and a hydroxyl number of 119.

TABLE 2

| Components | Example 13 | Example 14 | Example 15 |
|---|---|---|---|
| Polyisocyanate C/EG Solid Prepolymer | 5.0 g | 5.0 g | 5.0 g |
| Polyol A | — | 4.63 g | 4.05 g |
| Pluracol ® Polyol 1010 | 2.92 g | — | — |
| Pluracol ® Polyol 410 | 0.365 g | — | — |
| Pluracol ® Polyol 975 | 0.365 g | — | — |
| PolyTHF ™ 650 | — | — | 0.70 g |
| Dibutylin Dilaurate | ~25 mg | ~25 mg | ~25 mg |
| Potassium Acetate | ~10 mg | ~10 mg | ~10 mg |
| Index([NCO]/[OH]) | 120 | 120 | 110 |
| Temperature | 100-135° C. | 135° C. | 135° C. |

We claim:

1. A process for the preparation of a solid isocyanate terminated prepolymer in the form of a powder, comprising reacting a polyisocyanate with a low molecular weight polyol mixture in the presence of a urethane reaction promoting catalyst, in a solvent in which said polyisocyanate is soluble and in which said solid isocyanate terminated prepolymer is not soluble, and separating said solid isocyanate terminated prepolymer from the reaction mixture, wherein said polyisocyanate is selected from the group consisting of the toluene diisocyanates, the methylene bis(phenylisocyanate)s, the polymethylene polyphenylene polyisocyanates, and the modified isocyanates wherein two of the above isocyanate molecules are linked together with a urea, biuret, carbodiimide, uretdione, uretonimine or urethane linkage; wherein said low molecular weight polyol mixture comprises a mixture of simple glycols or triols optionally containing less than 30 weight percent based on the weight of the total polyol mixture of a polyoxyethylene glycol having a molecular weight below about 1000; wherein the simple glycol is a straight chain glycol having no more than one alkyl branch located on a carbon to which a hydroxyl group is attached when the glycol hydroxyl groups are not separated by more than two carbon atoms and wherein the monomeric isocyanate and glycol mixture is reacted in a ratio of 1.6 or more mole equivalents of isocyanate to 1 mole equivalent of glycol.

2. The process of claim 1 wherein said polyisocyanate is selected from the group consisting of 2,4- and 2,6-toluene diisocyanate, 2,4'-, 2,2'-, 2,4'- and 4,4'-methylene his (phenylisocyanate), the polymethylene polyphenylene polyisocyanates, and mixtures thereof.

3. The process of claim 1 wherein said simple glycol or triol is selected from the group consisting of ethylene glycol, diethylene glycol, triethylene glycol, propylene glycol, dipropylene glycol, tripropylene glycol, 1,4-butanediol, 1,6-hexanediol, neopentyl glycol, 1,4-cyclohexanediol, cyclohexane dimethanol, glycerine, trimethylolpropane, or mixtures thereof.

4. The process of claim 2 wherein said simple glycol or triol is selected from the group consisting of ethylene glycol, diethylene glycol, triethylene glycol, propylene glycol, dipropylene glycol, tripropylene glycol, 1,4-butanediol, 1,6-hexanediol, neopentylglycol, 1,4-cyclohexanediol, cyclohexanedimethanol, glycerine, trimethylolpropane or mixtures thereof.

* * * * *